US010124671B2

(12) United States Patent
 Nakane

(10) Patent No.: US 10,124,671 B2
(45) Date of Patent: Nov. 13, 2018

(54) DRIVE SWITCHING APPARATUS

(71) Applicant: AISIN SEIKI KABUSHIKI KAISHA, Kariya-shi, Aichi (JP)

(72) Inventor: Yasuhiro Nakane, Obu (JP)

(73) Assignee: AISIN SEIKI KABUSHIKI KAISHA, Kariya-Shi, Aichi-Ken (JP)

( * ) Notice: Subject to any disclaimer, the term of this patent is extended or adjusted under 35 U.S.C. 154(b) by 0 days.

(21) Appl. No.: 15/324,887

(22) PCT Filed: Aug. 25, 2015

(86) PCT No.: PCT/JP2015/073878
§ 371 (c)(1),
(2) Date: Jan. 9, 2017

(87) PCT Pub. No.: WO2016/035617
PCT Pub. Date: Mar. 10, 2016

(65) Prior Publication Data
US 2017/0210225 A1    Jul. 27, 2017

(30) Foreign Application Priority Data
Sep. 4, 2014 (JP) .................................. 2014-179779

(51) Int. Cl.
*G04F 1/00* (2006.01)
*G04F 3/02* (2006.01)
(Continued)

(52) U.S. Cl.
CPC ............. *B60K 23/08* (2013.01); *F16H 61/32* (2013.01); *B60K 2023/0891* (2013.01);
(Continued)

(58) Field of Classification Search
CPC .... F16H 1/16; F16H 19/04; F16H 2061/2876; F16H 2061/2892; F16G 61/32;
(Continued)

(56) References Cited

U.S. PATENT DOCUMENTS

2008/0115997 A1    5/2008  Banno et al.
2008/0280720 A1 *  11/2008 Ina .......................... B60K 17/16
                                                            475/230

FOREIGN PATENT DOCUMENTS

JP    2007-168575 A    7/2007
JP    2008-279880 A   11/2008

OTHER PUBLICATIONS

International Search Report (PCT/ISA/210) dated Nov. 17, 2015, by the Japanese Patent Office as the International Searching Authority for International Application No. PCT/JP2015/073878.
(Continued)

*Primary Examiner* — Anthony R. Jimenez
(74) *Attorney, Agent, or Firm* — Buchanan Ingersoll & Rooney PC

(57) ABSTRACT

A drive switching apparatus includes an output member connected to a drive switching member and displacing the drive switching member to three shift positions by being rotated, a deceleration mechanism decelerating rotation of an input portion connected to an electric motor and outputting the rotation to an output portion, a rotation absorption mechanism including an elastic member interposed between an input element connected to the output portion and an output element connected to the output member, the rotation absorption mechanism absorbing rotation of the input element in a case where rotation of the output element is restricted during the rotation of the input element, and a switch operation portion provided at the output element, the switch operation portion turning a switch on and off according to a rotational position of the output member in order to detect the shift positions of the drive switching member.

10 Claims, 8 Drawing Sheets

(51) Int. Cl.
*G04F 3/06* (2006.01)
*B60K 23/08* (2006.01)
*F16H 61/32* (2006.01)
F16H 19/04 (2006.01)
F16H 1/16 (2006.01)
F16H 61/28 (2006.01)

(52) U.S. Cl.
CPC ............... *F16H 1/16* (2013.01); *F16H 19/04* (2013.01); *F16H 2061/2876* (2013.01); *F16H 2061/2892* (2013.01)

(58) Field of Classification Search
CPC ..... B60K 2023/0891; G04F 3/02; G04F 3/06; G04F 1/00; H01H 2009/00; H01H 2009/20; H01H 2009/28; H01H 2221/01; H01H 2221/012; H01H 2221/024; H01H 2221/03; H01H 2221/06; H01H 2221/088; H01H 2231/026; H01H 2239/03; H01H 2239/05; H01H 2300/02; H01H 3/00; H01H 3/02; H01H 3/08; H01H 3/10; H01H 3/32; H01H 3/42; H01H 3/46; H01H 3/50; H01H 3/54; H01H 3/58; H01H 9/20; H01H 9/22; H01H 2003/00; H01H 9/02; H01H 9/0273; H01H 9/028; H01H 9/08; H01H 9/10; H01H 9/105
USPC ............. 200/33 R, 11 R, 11 C, 19.07, 19.18, 200/19.19, 19.2, 19.21, 336, 11 DA, 200/11 G, 11 TW, 19.01, 19.06, 19.14, 200/557, 558, 564
See application file for complete search history.

(56) References Cited

OTHER PUBLICATIONS

Written Opinion (PCT/ISA/237) dated Nov. 17, 2015, by the Japanese Patent Office as the International Searching Authority for International Application No. PCT/JP2015/073878.

* cited by examiner

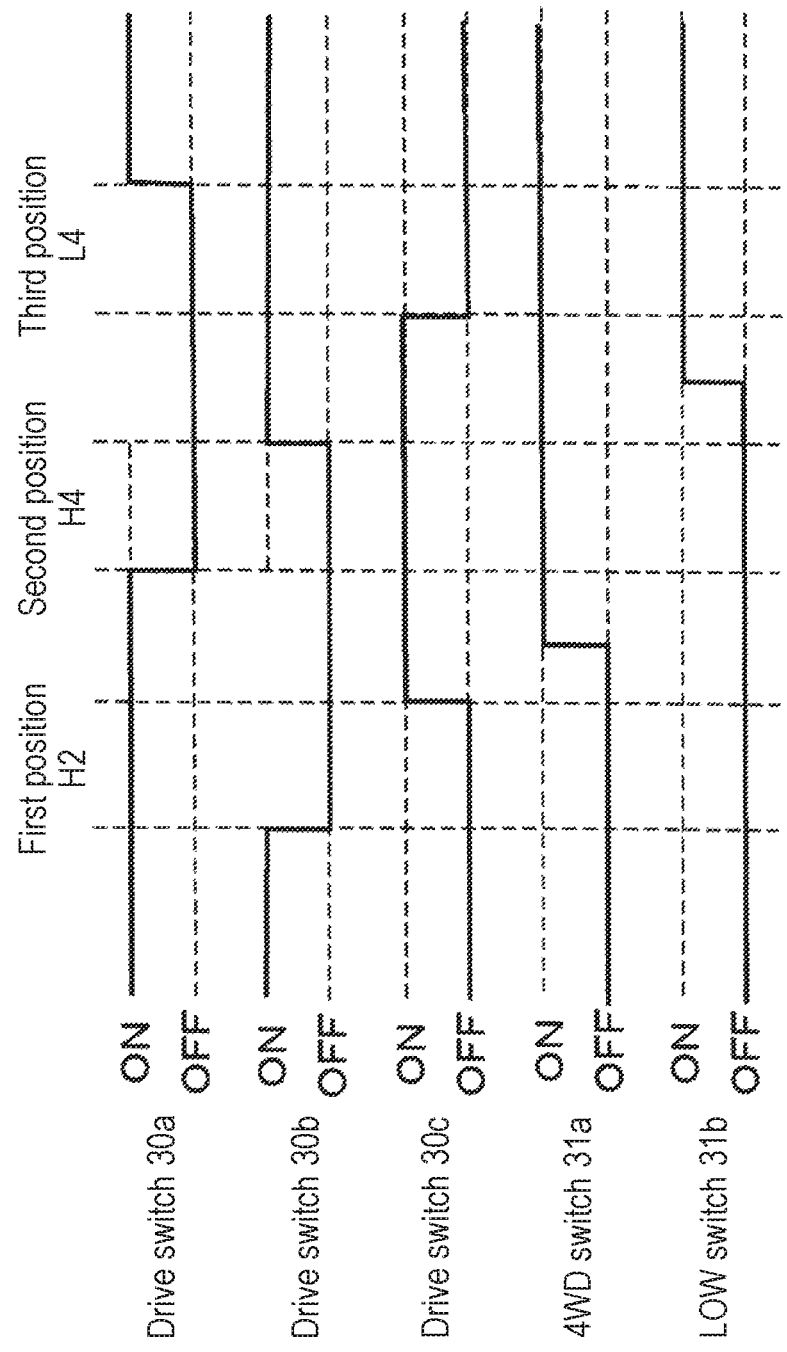

DRIVE SWITCHING APPARATUS

TECHNICAL FIELD

This invention is related to a drive switching apparatus which is capable of switching a four-wheel-drive vehicle to three drive states of the vehicle. For example, the three drive states of the vehicle corresponds to three states, that is, a two-wheel drive state in which a running torque is transmitted only to a pair of right rear and left rear wheels, and a four-wheel high speed drive state and a four-wheel low speed drive state in which the running torque is transmitted to a pair of right front and left front wheels and the pair of right rear and left rear wheels.

BACKGROUND ART

A known drive switching apparatus switching a four-wheel-drive vehicle to three drive states of the vehicle includes a drive switching member which can be displaced to three shift positions corresponding to the three drive states, an output member connected to the drive switching member and operating the drive switching member by being rotated, a gear driven and rotated by an electric motor, output shaft of the gear being rotatably connected, a rotation absorption mechanism interposed between the output shaft and the gear, and absorbing rotation of the electric motor in a case where the electric motor rotates and the output shaft cannot operate, and a shift position detection portion detecting a shift position of the drive switching member (for example, refer to Patent document 1).

DOCUMENT OF PRIOR ART

Patent Document

Patent document 1: JP2007-168575A

OVERVIEW OF INVENTION

Problem to be Solved by Invention

According to a technique described in Patent document 1, a resin holder is fixedly provided to the output shaft, at another position which is away from the rotation absorption mechanism in an axial direction, and the shift, position detection portion detecting the shift position of the drive switching member is provided at the resin holder. Thus, an exclusive member such as the resin holder is necessary to provide the shift position detection portion detecting the shift position of the drive switching member, and accordingly a configuration is complicated.

This invention is made in consideration of these circumstances and a purpose of this invention is to provide a drive switching apparatus of which a configuration can be simplified.

Means for Solving Problem

In order to solve the above-mentioned problems, a drive switching apparatus according to this invention includes a drive switching member which can switch a vehicle to three drive states and can be displaced to three shift positions corresponding to the three drive states, an output member connected to the drive switching member and displacing the drive switching member to the three shift positions by being rotated, a deceleration mechanism decelerating rotation of an input portion connected to an electric motor and outputting the rotation to an output portion, a rotation absorption mechanism including an elastic member interposed between an input element connected to the output portion and an output element connected to the output member, the rotation absorption mechanism absorbing rotation of the input element in a case where rotation of the output element is restricted during the rotation of the input element, and a switch operation portion provided at the output element, the switch operation portion turning a switch on and off according to a rotational position of the output member in order to detect the shift positions of the drive switching member.

Effect of the Invention

According to this, the switch operation portion detecting the shift position of the drive switching member is provided at the output element of the rotation absorption mechanism, and thus a member for exclusive use is not necessary because of the dual use of the output element of the rotation absorption mechanism. Consequently, the number of parts is reduced and the configuration can be simplified.

BRIEF DESCRIPTION OF DRAWINGS

FIG. 8 is a timing diagram for explaining an example of a drive control processing of this invention.

MODE FOR CARRYING OUT THE INVENTION

Figure 1:
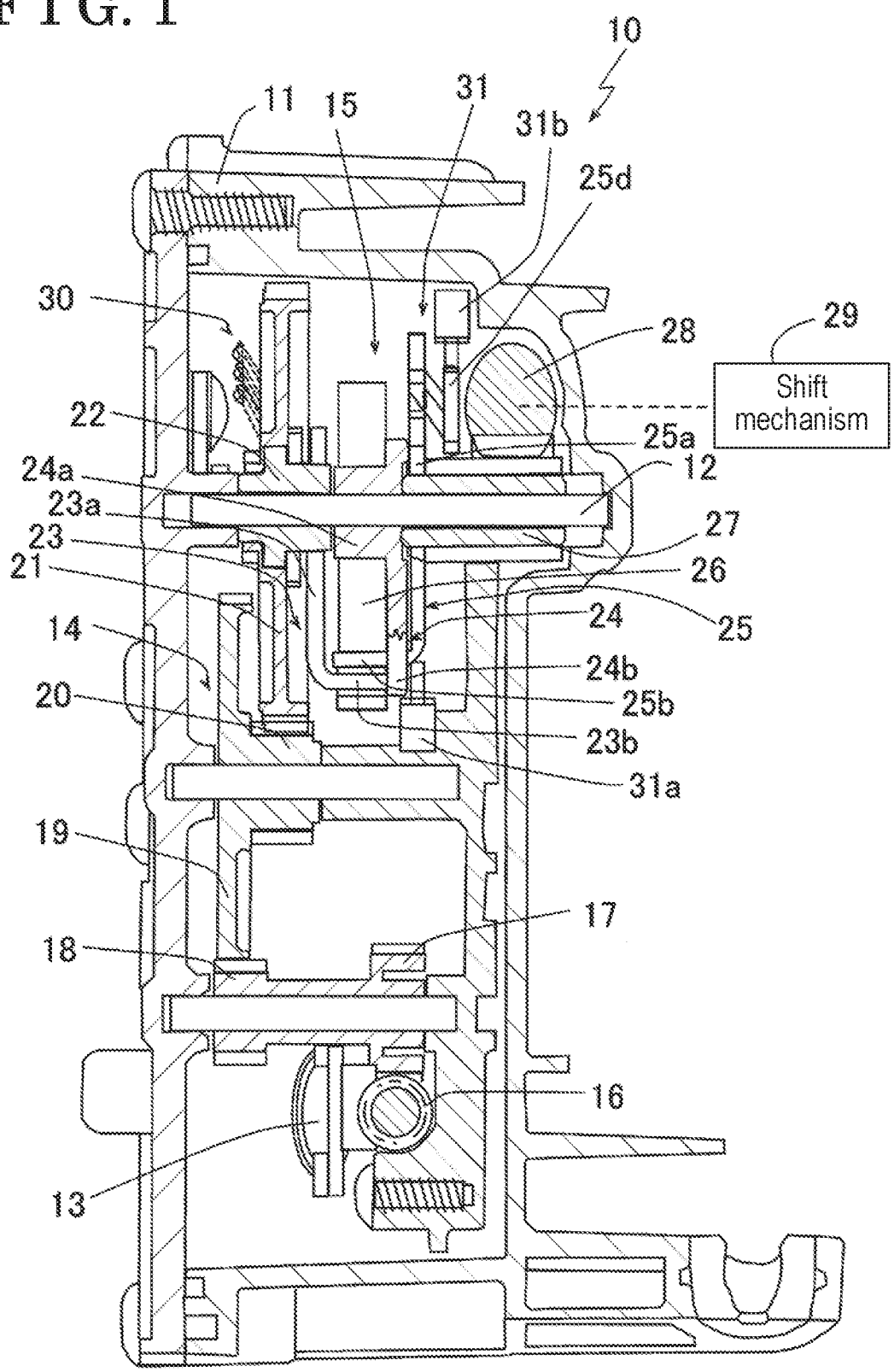
FIG. 1 is a longitudinal sectional view of a drive switching apparatus of an embodiment of this invention.

As illustrated in FIG. 1, a drive switching apparatus 10 for a four-wheel-drive vehicle according to an embodiment of this invention includes a housing 11 in which an output member 27 is rotatably supported on a shaft 12. A deceleration mechanism 14 driven and rotated by an electric motor 13, and a rotation absorption mechanism 15 absorbing rotation of the electric motor 13 in a case where the electric motor 13 is rotating and the output member 27 cannot operate are provided inside the housing 11. The output member 27 is rotatably connected to the electric motor 13 via the deceleration mechanism 14 and the rotation absorption mechanism 15.

The deceleration mechanism 14 includes a worm gear 16 fixed to a rotational shaft of the electric motor 13, a worm wheel 17 engaging with the worm gear 16, a first small-diameter gear 18 rotating integrally with the worm wheel 17, a first large-diameter gear 19 engaging with the first small-diameter gear 18, a second small-diameter gear 20 rotating integrally with the first large-diameter gear 19, a second large-diameter gear 21 engaging with the second small-diameter gear 20 and fixed, via a bush 22, to the shaft 12 to be relatively rotatable. The bush 22 is rotatably attached on the shaft 12. The worm gear 16 serves as an input portion of the deceleration mechanism 14 and the bush 22 serves as an output portion of the deceleration mechanism 14. Thus, the deceleration mechanism 14 decelerates rotation of the worm gear 16 serving as the input portion connected to the electric motor 13 and outputs the rotation to the bush 22 serving as the output portion. The electric motor 13 can rotate the worm gear 16 in forward and reverse directions.

The rotation absorption mechanism 15 includes a lever member 23 serving as an input element and connected to the bush 22 serving as the output portion of the deceleration mechanism 14 by, for example, crimping. The rotation absorption mechanism 15 also includes a bush member 24 of which a base section 24a is rotatably attached to the shaft 12, a plate member 25 connected to the output member 27 and serving as an output element, and a spiral spring 26 interposed between the lever member 23 and the plate member 25 and serving as an elastic member biasing the lever member 23 and the plate member 25. The rotation absorption mechanism 15 absorbs rotation of the lever member 23 serving as the input element in a case where rotation of the plate member 25 serving as the output element is restricted during the rotation of the lever member 23 serving as the input element.

The lever member 23 includes a substantially L-shaped shape as a whole, and is formed by a first section 23a that is adjacent to the second large-diameter gear 21, and a second section 23b extended in parallel with the shaft 12 to be away from the second large-diameter gear 21.

Figure 2:
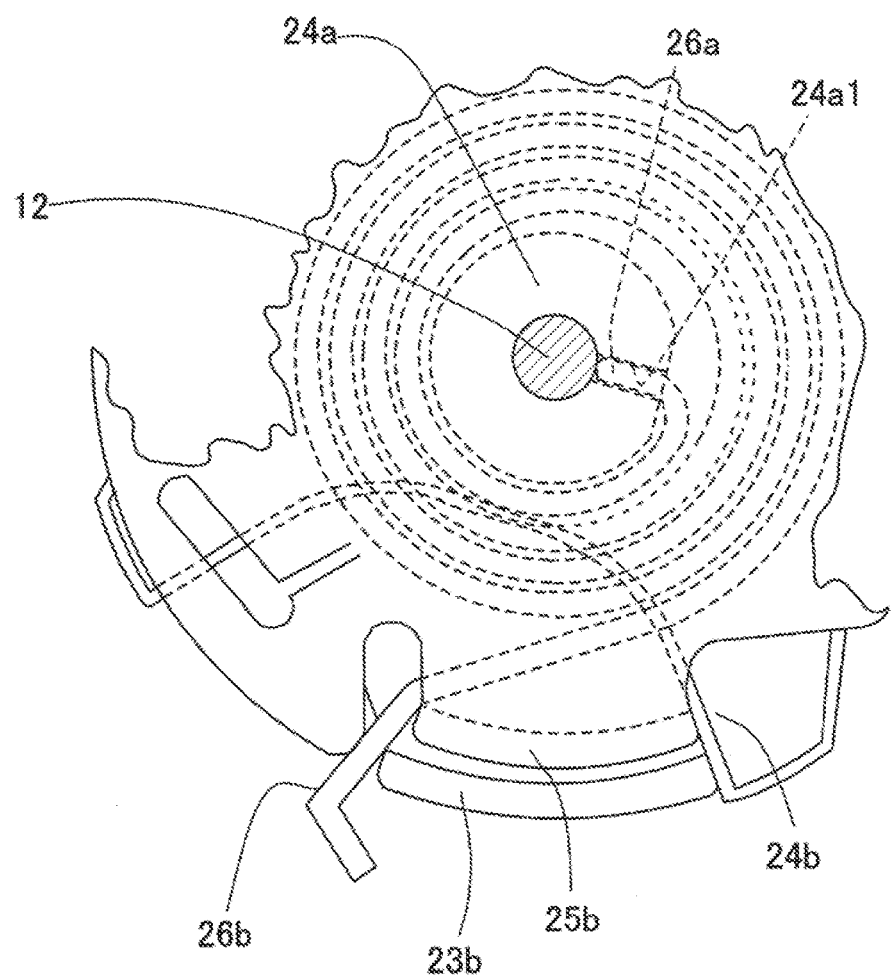
FIG. 2 is a view illustrating a configuration of the vicinity of a rotation absorption mechanism of the embodiment of this invention, in a manner that a part of the configuration is cut out.

A diameter-extended portion 24b is extended in a radial direction from a right end portion of the base section 24a of the bush member 24. The spiral spring 26 is attached on the base section 24a of the bush member 24. An inner end portion 26a of the spiral spring 26 is closely fitted in a groove 24a1 and fixed thereat as illustrated in FIG. 2. The groove 24a1 is engraved at the base section 24a of the bush member 24. An outer end portion 26b of the spiral spring 26 is bent and engages with the second section 23b of the lever member 23. Due to this engagement, the lever member 23 is biased in the counterclockwise direction in FIG. 2 and the second section 23b of the lever member 23 engages with the diameter-extended portion 24b of the bush member 24.

A first portion 25a of the plate member 25 is fixed to the output member 27. A second portion 25b of the plate member 25 is extended towards the second large-diameter gear 21 in a direction of a rotational axis line of the output member 27 to be positioned between the diameter-extended portion 24b of the bush member 24 and the spiral spring 26, and the second portion 25b forms an engagement portion that is engageable with the outer end portion 26b of the spiral spring 26.

In the rotation absorption mechanism 15, when the lever member 23 rotates in one direction, a rotational force thereof is transmitted to the bush member 24, the spiral spring 26, the plate member 25 and the output member 27 in the mentioned order. When the lever member 23 rotates in another direction, the rotational force thereof is transmitted to the spiral spring 26, the bush member 24, the plate member 25 and the output member 27 in the mentioned order.

The output member 27 is connected to a fork shaft 28 by a rack-and-pinion. The fork shaft 28 is operationally connected to a shift mechanism 29, and the fork shaft 28 moves in one direction (another direction) when the output member 27 rotates in one direction (another direction) by a predetermined angle. The fork shaft 28 is configured to be any of a first position H2 in which the shift mechanism 29 is in a two-wheel drive state, a second position H4 in which the shift mechanism 29 is in a four-wheel high speed drive state, and a third position L4 in which the shift mechanism 29 is in a four-wheel low speed drive state where a speed reduction ratio is larger than in the four-wheel high speed drive state. In a case where the fork shaft 28 shifts or changes from the first position H2 to the second position H4, the shift mechanism is switched from the two-wheel drive state to the four-wheel high speed drive state. In a case where the fork shaft 28 shifts or changes from the second position H4 to the third position L4, the shift mechanism 29 is switched from the four-wheel high speed drive state to the four-wheel low speed drive state.

Figure 7:
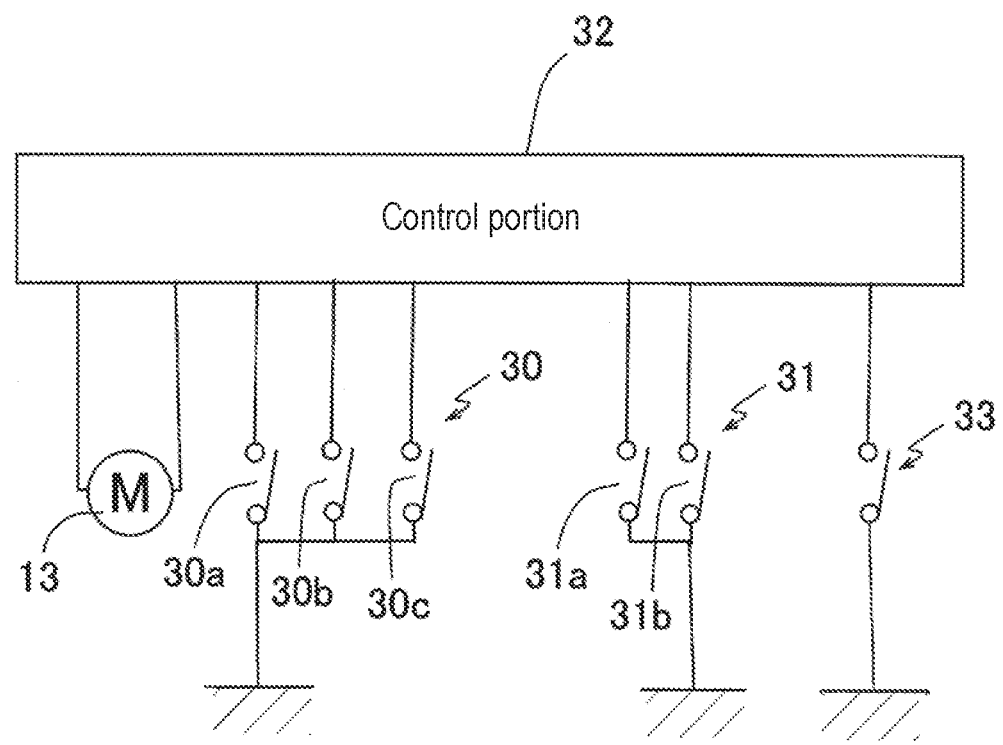
FIG. 7 is an electric circuit diagram of the drive switching apparatus.

The above-described change of the shift positions of the fork shaft 28 is performed by controlling the operation of rotating and stopping the electric motor 13 on the basis of a detection signal of a deceleration mechanism rotational position detection portion 30 which detects a rotational position of the deceleration mechanism 14. That is, as illustrated in FIG. 1, at the deceleration mechanism rotational position detection portion 30, electrode (not shown) is attached to an end surface of the second large-diameter gear 21 rotated by the electric motor 13, and the electrode is configured to be in contact with and out of contact with three drive switches 30a, 30b and 30c, and thus is turned ON and OFF. As illustrated in FIG. 7, ON/OFF signals from the three drive switches 30a, 30b and 30c are sent to a control portion 32. According to the combinations of the ON/OFF of the three drive switches 30a, 30b and 30c which are shown in FIG. 8, a rotation control of the motor 13 is conducted and a shift control of the fork shaft 28 to the first position H2, the second position H4 and the third position L4 is conducted.

In a case where the fork shall 28 shifts or moves from the first position H2 to the second position H4, if a phase of two shift gears (not shown) which are to be spline-connected by a slider (not shown) moved by the fork shaft 28 in the shift mechanism 29 is deviated, the fork shaft 28 does not move and the output member 27 does not rotate either, however, a rotational force of the electric motor 3 is once stored at the spiral spring 26. When the phase of the two shift gears are matched each other after the electric motor 13 stops, the torque stored at the spiral spring 26 causes the output member 27 to rotate, the fork shaft 28 moves, and the slider makes the two shift gears spline-connected to each other. In a case where the fork shaft 28 shifts from the second position H4 to the first position H2, if the spline-connection between the two shift gears which are to be released by the slider moved by the fork shaft 28 in the shift mechanism 29 is tight, the fork shaft 28 does not move and the output member 27 does not rotate either, however, the rotational force of the motor 13 is once stored at the spiral spring 26. When the spline-connection of the two shift gears is loosed after the electric motor 13 stops, the torque stored at the spiral spring 26 causes the output member 27 to rotate, the fork shaft 28 moves, and the slider releases the spline-connection between the two shift gears.

The shift positions, that is, the first position H2 of the fork shaft 28 in which the shift mechanism 29 is in the two-wheel drive state, the second position H4 of the fork shaft 28 in which the shift mechanism 29 is in the four-wheel high speed drive state, and the third position L4 of the fork shaft 28 in which the shift mechanism 29 is in the four-wheel low speed drive state where the speed reduction ratio is larger than in the four-wheel high speed drive state, are detected by a shift position detection portion 31 provided at the rotation absorption mechanism 15. The shift position detection portion 31 includes a first cam portion 25c, a second cam portion 25d, a 4WD switch 31a and a LOW switch 31b. The first carry portion 25c and the second cam portion 25d form or constitute cam portions serving as switch operation portions provided at the plate member 25 serving as the output element of the rotation absorption mechanism 15. The 4WD switch 31a and the LOW switch 31b are provided at the housing 11, and form switches that are switched into ON and OFF by alternatively engaging with the first cam portion 25c and the second cam portion 25d.

Figure 3:
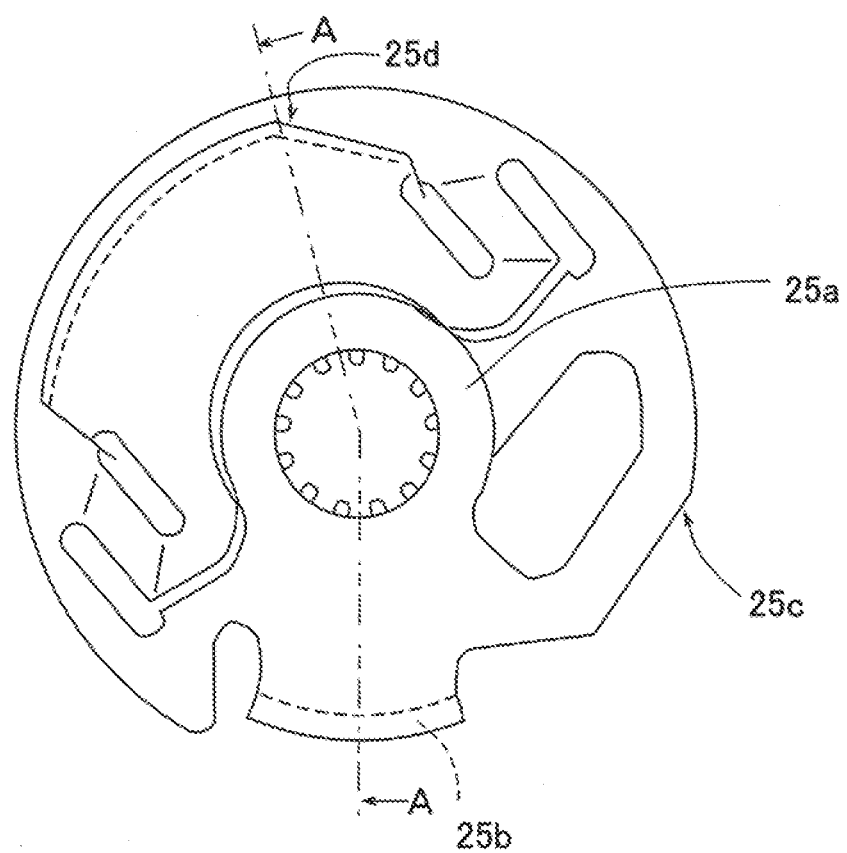
FIG. 3 is a plan view of a plate member of the embodiment of this invention.
Figure 4:
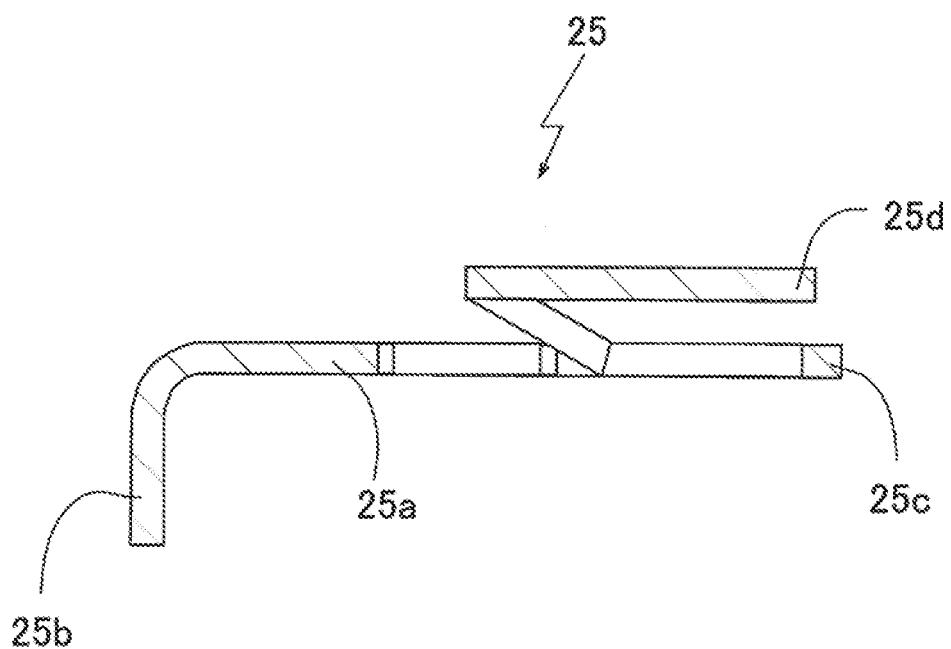
FIG. 4 is a cross-sectional view taken along line A-A in FIG. 3.

As illustrated in FIGS. 1, 3 and 4, the first cam portion 25c and the second cam portion 25d are provided at the plate member 25 formed of the plate member, in a manner that, the first cam portion 25c and the second cam portion 25d are away from each other in the direction of the rotational axis line of the output member 27 and in a circumferential direction of the plate member 25. The plate member 25 is extruded from a base portion 25a in the direction of the rotational axis line of the output member 27 and in a radially outward direction of the output member 27, and thus the second cam portion 25d is formed. The first cam portion 25c and the second cam portion 25d also can be formed by plastic-deforming, for example, by pressing or stamping, the plate member 25 made of the plate material. The second portion 25b of the plate member 25 is provided at the plate member 25, at a side which is opposite, in the direction of the rotational axis line of the output member 27, to a side, at which the second cam portion 25d is provided.

Figure 5:
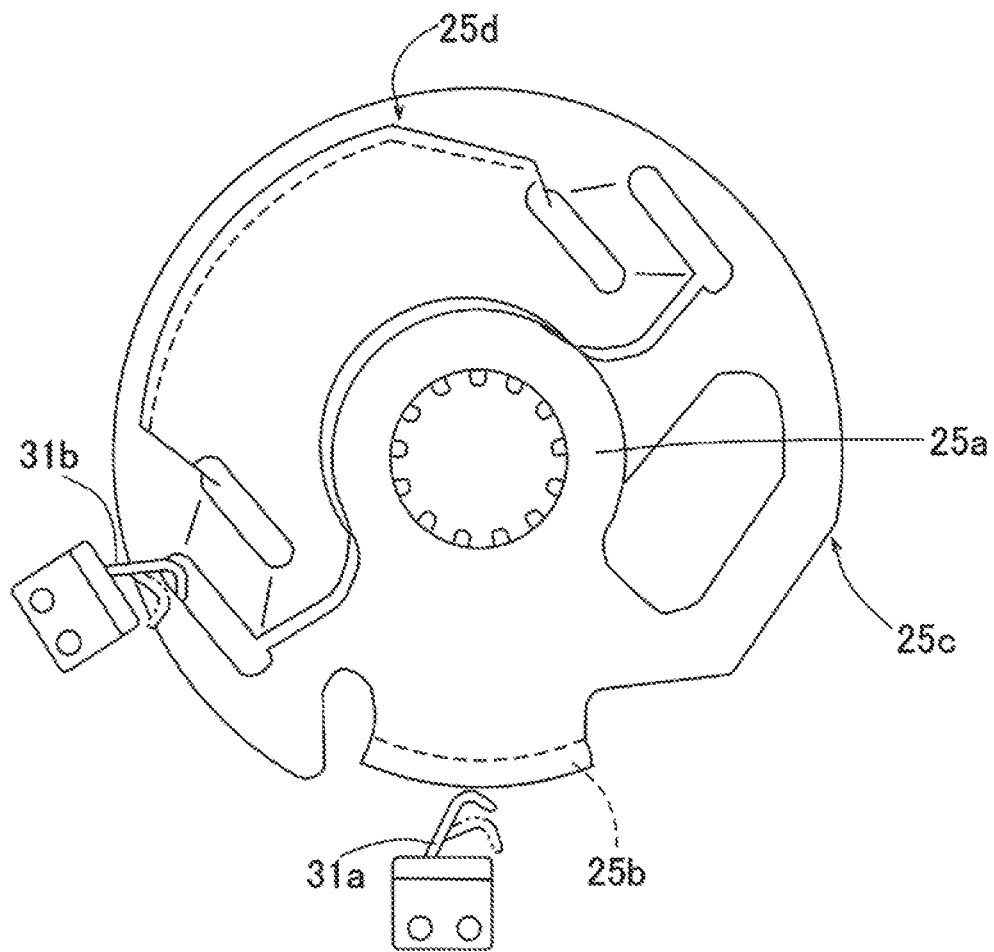
FIG. 5 is an explanatory view of an arrangement of the plate member and changeover switches, which is seen from an axial direction.
Figure 6:
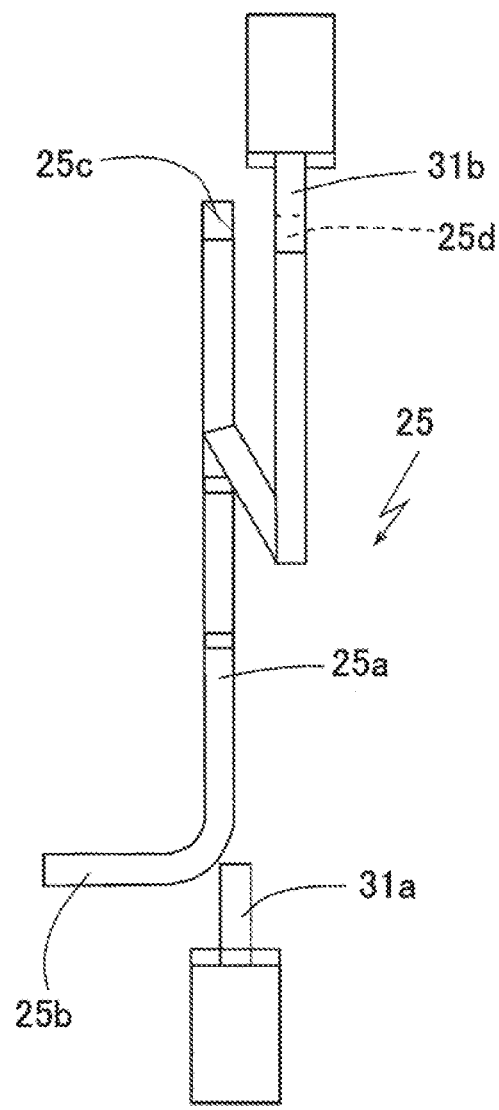
FIG. 6 is an explanatory view of the arrangement of the plate member and the changeover switches, which is seen from a direction perpendicular to the axial direction.

An arrangement of the first cam portion 25c, the second cam portion 25d, the 4WD switch 31a and the LOW switch 31b at the shift position detection portion 31 is as illustrated in FIG. 5. The LOW switch 31b is arranged at a radially inner side of the plate member 25 relative to the 4WD switch 31a and is apart relative to the plate member 25 in the direction of the axial line. FIG. 5 illustrates the first position H2 of the fork shaft 28. In a state where the fork shaft 28 is in the first position H2, the 4WD switch 31a is disengaged from the first cam portion 25c and thus is OFF, and the LOW switch 31b is disengaged from the second cam portion 25d and thus is OFF. As the plate member 25 rotates in the clockwise direction from the first position H2 illustrated in FIG. 5 and comes to be in the second position H4, the first cam portion 25c engages with the 4WD switch 31a and thus the 4WD switch 31a is switched to OFF, and the LOW switch 31b remains OFF because the second cam portion 25d is still disengaged from the LOW switch 31b. As the plate member 25 further rotates in the clockwise direction from the second position H4 and comes to be in the third position L4, the 4WD switch 31a remains ON because the 4WD switch 31a is kept engaged with the first cam portion 25c. The second cam portion 25d comes to engage with the LOW switch 31b, and thus the LOW switch 31b is switched to ON. As illustrated in FIG. 7, the ON/OFF signals from the 4WD switch 31a and the LOW switch 31b are sent out to the control portion 32.

As described above, as illustrated in FIG. 8, according to the combinations of ON and OFF of the 4WD switch 31a and the LOW switch 31b of the shift position detection portion 31, the shifting or moving of the fork shaft 28 to the first position H2, the second position H4 and the third position L4 is detected.

It is apparent that control of the switch states by the drive switches 30a, 30b and 30c of the deceleration mechanism rotational position detection portion 30, and the detection of the actual shift positions H2, H4, L4 by the 4WD switch 31a and the LOW switch 31b of the shift position detection portion 31 are performed in a manner that the control portion 32 reads program data stored at a storage device including ROM or RAM, for example.

At the drive switching apparatus 10, when a switching signal to each of the drive states, that is, the two-wheel drive state, the four-wheel high speed drive state and the four-wheel low speed drive state, is detected, the signal is read into the control portion 32. The switching signal is outputted from an operation switch 33 (illustrated in FIG. 7) provided, for example, in the vicinity of a driver's seat of the vehicle at a position at which the operation switch 33 is operable. On the basis of a command from the control portion 32, the shift mechanism 29 is moved by a predetermined stroke via the fork shaft 28 serving as a drive switching member, and accordingly a switching operation to each of the drive states is performed.

One of the plural cam portions 25c and 25d serving as the switch operation portions may be provided separately from the plate member 25 serving as the output element of the rotation absorption mechanism 15, and one of the plural change-over switches 31a and 31b may be operable by an operation of a separate member connected to the plate member 25 serving as the output element of the rotation absorption mechanism 15. This configuration also corresponds to the configuration which the switch operation portion is provided at the output element of the rotation absorption mechanism 15.

The configuration is indicated in which the second cam portion 25d is formed in such a manner that the plate member 25 is pressed or pushed out from the base portion 25a in the direction of the rotational axis line of the output member 27 and in the radially outward direction of the output member 27. Instead of this configuration, it is apparent that the second cam portion 25d may be formed separately from the plate member 25, and thereafter the second cam portion 25d may be integrated into the plate member 25 by welding or spline-connection.

As described above, the drive switching apparatus 10 of the embodiment of this invention includes the drive switching member 28 which can switch the vehicle to the three drive states and can be displaced to the three shift positions H2, H4, L4 corresponding to the three drive states, the output member 27 connected to the drive switching member 28 and displacing the drive switching member 28 to the three shift positions H2, H4, L4 by being rotated, the deceleration mechanism 14 decelerating the rotation of the input portion 16 connected to the electric motor 13 and outputting the rotation to the output portion 22, the rotation absorption mechanism 15 including the elastic member 26 interposed, between the input element 23 connected to the output portion 22 and the output element 25 connected to the output member 27, the rotation absorption mechanism 15 absorbing the rotation of the input element 23 in a case where the rotation of the output element 25 is restricted during the rotation of the input element 23, and the switch operation portion 25c and 25d provided at the output element 25, the switch operation portion 25c and 25d turning the switch 31a, 31b ON and OFF according to the rotational position of the output member 27 in order to detect the shift positions H2, H4, L4 of the drive switching member 28. Thus, the switch operation portions 25c and 25d which detect the shift positions H2, H4 and L4 of the drive switching member 28 are provided at the output demerit 25 of the rotation absorption mechanism 15, and therefore the member for the exclusive use is not necessary because of the dual use of the output element 25 of the rotation absorption mechanism 15.

Consequently, the number of parts is reduced and the configuration can be simplified.

As described above, according to the drive switching apparatus 10 of the embodiment of this invention, the switch operation portions 25c and 25d include the two switch operation portions provided to operate the two switches 31a and 31b, respectively, and at least one of the two switch operation portions 25c and 25d, that is, the switch, operation portion 25d, is formed in a manner that part of the output element 25 is pressed out in the direction of the rotational axis line of the output member 27. Accordingly, the switch operation portion 25d, which is one of the two switch operation portions 25c and 25d, does not need to be assembled on the output element 25, and consequently the manufacturing is simplified.

As described above, according to the drive switching apparatus 10 of the embodiment of this invention, the output element 25 is formed by the plate member, and the switch operation portions 25c and 25d are formed by plastic-deforming the plate member. Accordingly, the output element 25, and the switch operation portions 25c and 25d are integrally formed of the plate member, and thus are manufactured easily.

As described above, according to the drive switching apparatus 10 of the embodiment of this invention, the output element 25 includes the engagement portion 25b which is engageable with the elastic member 26, and the engagement portion 25b is provided at the output element 25, at the side which is opposite, in the direction of the rotational axis line of the output member 27, to the side at which the switch operation portion 25d is provided. Accordingly, the elastic member 26, and the switches 31a and 31b are arranged away from each other, and therefore the elastic member 26, and the switches 31a and 31b are prevented from being in contact with each other.

As described above, according to the drive switching apparatus 10 of the embodiment of this invention, at least one of the two switch operation portions 25c and 25d, that is, the switch operation portion 25d, is formed in a manner that the output element 25 is pressed out from the base portion 25a in the direction of the rotational axis line of the output member 27 and in the radially outward direction of the output member 27. Accordingly, at least one of the two switch operation portions 25c and 25d, that is, the switch operation portion 25d, does not need to be assembled on the output element 25, and consequently the manufacturing is simplified. Because the switch operation portion 25d, which is one of the two switch operation portions 25c and 25d, is formed by being pressed out radially outwardly, the switch 31b that engages with the switch operation portion 25d and thus is switched can be arranged at a position at which the switch 31b is easily prevented from being interfered with the output element 25.

As described above, the drive switching apparatus 10 of the embodiment of this invention includes the deceleration mechanism rotational position detection portion 30 detecting the rotational position of the deceleration mechanism 14, wherein the operation of the electric motor 13 is controlled in accordance with the detection signal of the deceleration mechanism rotational position detection portion 30. Accordingly, a displacement control of the drive switching member 28 is conducted.

In a case where plural embodiments are applicable, it is apparent that aspects of the respective embodiments may be combined with each other appropriately unless otherwise noted.

EXPLANATION OF REFERENCE NUMERALS

10 . . . drive switching apparatus
11 . . . housing
13 . . . electric motor
14 . . . deceleration mechanism
15 . . . rotation absorption mechanism
16 . . . worm gear (input portion of the deceleration mechanism)
22 . . . bush (output portion of the deceleration mechanism)
23 . . . lever member (input element of the rotation absorption mechanism)
25 . . . plate member (output element of the rotation absorption mechanism)
25b . . . second portion (engagement portion)
25c . . . first cam portion (switch operation portion)
25d . . . second cam portion (switch operation portion)
26 . . . spiral spring (elastic member)
27 . . . output member
28 . . . fork shaft (drive switching member)
30 . . . deceleration mechanism rotational position detection portion
31 . . . shift position detection portion
31a . . . 4WD switch (switch)
31b . . . LOW switch (switch)

The invention claimed is:

1. A drive switching apparatus comprising:
a drive switching member which can switch a vehicle to three drive states and can be displaced to three shift positions corresponding to the three drive states;
an output member connected to the drive switching member and displacing the drive switching member to the three shift positions by being rotated;
a deceleration mechanism decelerating rotation of an input portion connected to an electric motor and outputting the rotation to an output portion;
a rotation absorption mechanism including an elastic member interposed between an input element connected to the output portion and an output element connected to the output member, the output element including an engagement portion which is provided at the output element and is engageable with the elastic member, the rotation absorption mechanism absorbing rotation of the input element in a case where rotation of the output element is restricted during the rotation of the input element; and
a switch operation portion provided at the output element, the switch operation portion turning a switch on and off according to a rotational position of the output member in order to detect the shift positions of the drive switching member.

2. The drive switching apparatus according to claim 1, wherein
the output element is formed by a plate member, and
the switch operation portion is formed by plastic-deforming the plate member.

3. The drive switching apparatus according to claim 1, wherein
the engagement portion is provided at the output element, at a side which is opposite, in the direction of the rotational axis line of the output member, to a side at which the switch operation portion is provided.

4. The drive switching apparatus according to claim 1, further comprising:
a deceleration mechanism rotational position detection portion detecting a rotational position of the deceleration mechanism, wherein operation of the electric motor is controlled in accordance with a detection signal of the deceleration mechanism rotational position detection portion.

5. The drive switching apparatus according to claim 1, wherein
the switch operation portion and the engagement portion are integrated into the output element.

6. The drive switching apparatus according to claim 1, wherein
the output element is formed by a plate member and is provided with the switch operation portion and the engagement portion, and
the engagement portion is provided at the output element, at a side which is opposite, in the direction of the rotational axis line of the output member, to a side at which the switch operation portion is formed.

7. The drive switching apparatus according to claim 1, wherein
the switch operation portion includes two cam portions provided to operate two switches, respectively, and
at least one of the two cam portions is formed in a direction of a rotational axis line of the output member and in a radially outward direction of the output member.

8. The drive switching apparatus according to claim 7, wherein at least one of the two cam portions is formed in a manner that the output element is pressed out from a base portion in the direction of the rotational axis line of the output member and in the radially outward direction of the output member.

9. The drive switching apparatus according to claim 7, wherein
the two cam portions and the engagement portion are integrated into the output element.

10. The drive switching apparatus according to claim 7, wherein
the output element is formed by a plate member and is provided with the two cam portions and the engagement portion, and
the engagement portion is provided at the output element, at a side which is opposite, in the direction of the rotational axis line of the output member, to a side at which the two cam portions are formed.

* * * * *